United States Patent [19]
Rogers

[11] 3,967,829
[45] July 6, 1976

[54] SEAL RING
[75] Inventor: William A. Rogers, San Pedro, Calif.
[73] Assignee: Rogers-Dierks, Inc., San Pedro, Calif.
[22] Filed: Nov. 25, 1974
[21] Appl. No.: 526,840

Related U.S. Application Data
[63] Continuation of Ser. No. 339,649, March 9, 1973, abandoned.

[52] U.S. Cl............................ 277/149; 277/160; 277/235 A
[51] Int. Cl.² ........................................ F16J 9/06
[58] Field of Search............. 277/231, 235 A, 149, 277/160

[56]     References Cited
         UNITED STATES PATENTS
| | | | |
|---|---|---|---|
| 452,900 | 5/1891 | Wheelock | 277/149 |
| 1,773,250 | 8/1930 | Amberg | 277/161 |
| 2,083,237 | 6/1937 | Norton | 277/149 |
| 2,117,986 | 5/1938 | Robertson | 277/160 |
| 2,311,559 | 2/1943 | Mason | 277/159 |
| 2,746,819 | 5/1956 | Olson | 277/149 |
| 3,586,290 | 6/1971 | Null | 277/161 |
| 3,671,047 | 6/1972 | Umezawa | 277/235 R |
| 3,806,139 | 4/1974 | Sugahara | 277/235 A |

*Primary Examiner*—Samuel B. Rothberg
*Attorney, Agent, or Firm*—Christie, Parker & Hale

[57]     ABSTRACT

A seal ring for sealing an annular space between two telescoped and relatively movable parts. The ring seats in a groove in one of the parts, and leaf springs urge the seated ring against the other part to effect the seal. The leaf springs include annealed or reduced-cross-section portions which provide relatively low-rate and long-travel spring characteristics to accommodate tolerance variations, dimensional changes of the ring as wear occurs, and thermal expansion or contraction of the sealed parts. The wearing surfaces of the ring may be covered by a plastic cap or anti-galling coating.

2 Claims, 6 Drawing Figures

U.S. Patent July 6, 1976 3,967,829
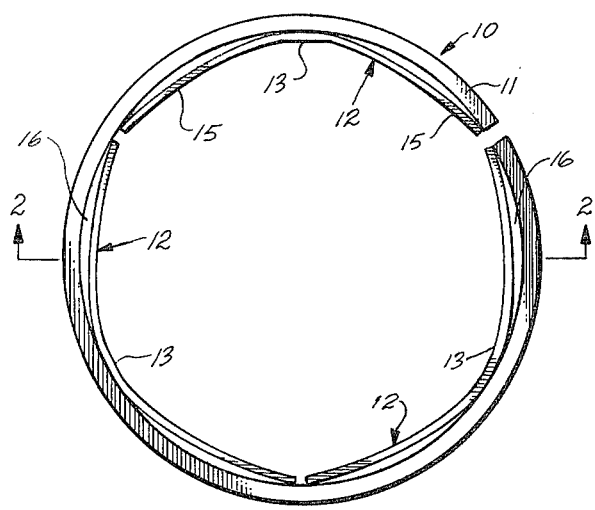
FIG_1
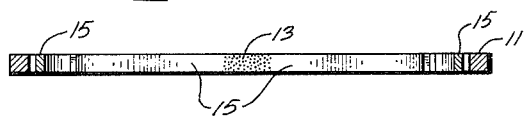
FIG_2
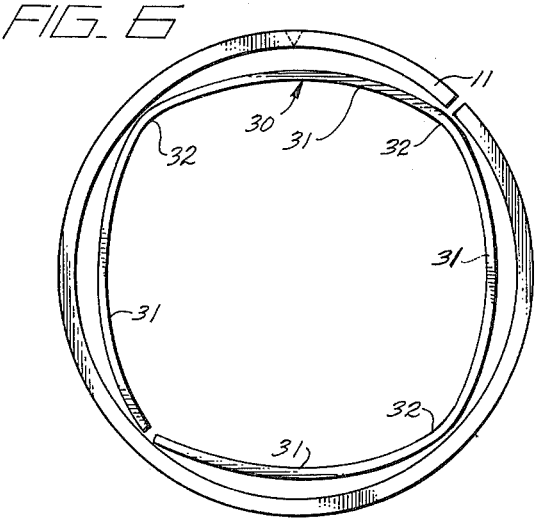
FIG_6
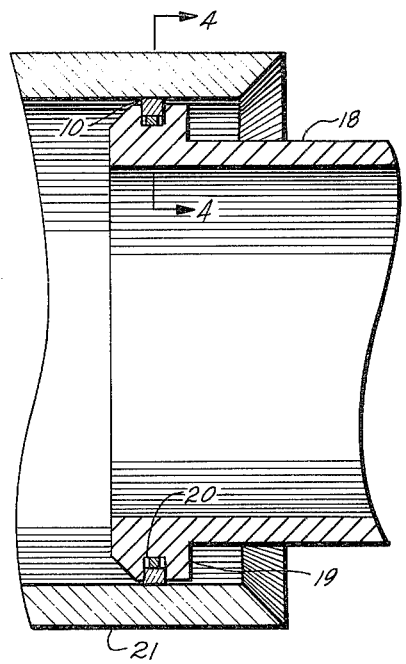
FIG_3
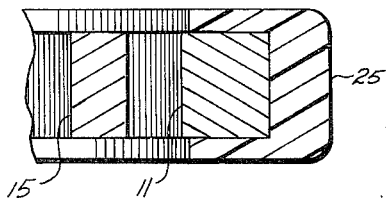
FIG_5
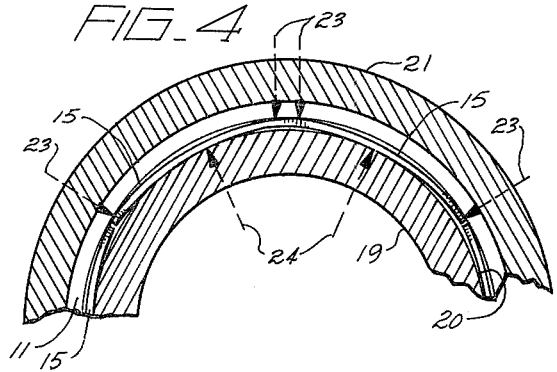
FIG_4

SEAL RING

CROSS REFERENCE TO RELATED APPLICATION

This is a continuation of application Ser. No. 339,649, filed Mar. 9, 1973, now abandoned.

BACKGROUND OF THE INVENTION

Split-ring seals are useful in many applications to seal an annular space between a cylindrical member fitted in a bore. Conventional piston rings used in engines are a well-known example of such seals. Each ring is expanded to slide over the piston into an annular groove. The ring is then compressed into the groove when the piston is fitted into a cylinder. The resiliency of the ring urges the ring periphery against the cylinder wall to effect the desired seal.

Known styles of seal rings are not always satisfactory in applications involving severe vibratory motion because the ring wears rapidly, and the loading on the ring may decrease rapidly with progressive wear until the sealing effect is lost. Backup springs have been used in the ring groove between the piston (or equivalent part) and inner ring surface, but a conventional high-rate spring is of limited assistance in compensating for ring wear because the restoring force acting on the ring to effect a seal drops rapidly with a slight decrease in ring cross-section due to wear.

The problem of seal-ring wear is aggravated in applications where extensive dismantling of an assembly or machine is necessary to replace the ring. For example, aircraft fan-jet engines have a severe sealing problem in bleed-air ducts used to convey hot gas from a central compressor section radially outwardly through an outer housing or fan case to pipes leading to wing deicers or other accessories.

Large and variable temperature differentials exist between the compressor-section case and fan case during the various operating modes of the engine, and considerable longitudinal and radial freedom must be built into the bleed-air duct to compensate for dimensional changes of the compressor section and fan case arising from these temperature variations. That is, the duct must be able to elongate or contract to compensate for changes in the annular space between the compressor and fan cases as these parts radially expand or contract relative to each other.

To provide the necessary longitudinal and radial freedom, the bleed-air duct between the compressor and fan cases is typically formed by a loosely fitted pair of telescoped tubes which are longitudinally movable to vary the length of the duct during engine operation. The tubes are sealed (to prevent loss of the high-pressure bleed-air) by a conventional seal-ring (similar to a piston ring) fitted between the inner and outer tubes. The operating temperature of the duct is usually too high to permit lubrication of the seal ring, so the telescoped tubes in effect form a dry (unlubricated) slip joint.

Conventional seal rings tend to wear rapidly due to the high-vibration and high-temperature environment of the bleed duct. After a little initial wear has occurred, the interface load of the seal ring drops sharply, leading to more rapid wear as the parts rattle and impact each other with increasing force. The result is that relatively frequent replacement of the seal ring and duct tubes is required, and an expensive dismantling of the engine is involved in doing this work.

The seal ring of this invention provides a long-life seal for bleed ducts, and substantially extends the time-between-overhaul period for these parts. Although the new ring is somewhat more expensive to make than a conventional piston ring, this cost increase is negligible when compared to the expense of engine teardown and aircraft out-of-service time caused by use of known seals. Use of the new seal ring is not restricted to jet-engine bleed ducts, and the ring has utility in many other applications requiring minimum wear of the sealed parts, and where a relatively constant or "flat" seal loading is desired in spite of conditions which produce relatively rapid wear of the ring.

SUMMARY OF THE INVENTION

Briefly stated, this invention relates to a seal ring assembly for sealing a peripheral space between a member which makes a slip fit in a bore of a second receiving member. One of the two members has a ring groove to receive the ring assembly. The assembly includes a split ring, and a loading means fitted within the ring. The loading means includes a plurality of leaf springs, each having ends bearing on the ring, and having a central portion bearing on the grooved member when the ring is compressed into the ring groove. The loading means is effective to urge the ring radially away from the grooved member into sealing contact with the surface of the other member. Each leaf spring is substantially freely supported at its ends to deflect under loading substantially as a simple beam.

In one form, adjacent ends of adjacent leaf springs are joined together to form a series of leaf springs arranged peripherally on the ring. Preferably, the means joining the adjacent ends is an integral extension of the ends, the extension being softened or annealed to prevent the introduction of bending moments where the leaf ends contact the ring. In one embodiment, the spring members are secured to the peripheral surface of the split ring by spot welding which automatically anneals the junction of the adjacent leaf springs.

The seal ring assembly may include a sacrificial jacket which is preferably an annular cap having a generally C-shape cross-section, the cap being fitted over the peripheral and side surfaces of the split ring. The cap may be formed of a reinforced plastic material such as bronze-filled fluorocarbon plastic.

DESCRIPTION OF THE DRAWINGS

FIG. 1 is an elevation of the seal ring assembly according to the invention;

FIG. 2 is a sectional view on line 2—2 of FIG. 1;

FIG. 3 is a sectional elevation showing the seal ring assembly mounted between a pair of telescoped parts;

FIG. 4 is a sectional view on line 4—4 of FIG. 3;

FIG. 5 is an enlarged cross-section of a portion of the seal ring assembly shown in FIG. 2 and including a plastic jacket; and FIG. 6 is an elevation of another embodiment of the seal ring assembly.

DESCRIPTION OF THE PREFERRED EMBODIMENTS

A seal ring assembly 10 according to the invention is shown in FIGS. 1 and 2, and includes a split ring 11. The cross-section of the ring is shown as rectangular (similar to a conventional piston ring), but other cross-sectional shapes can also be used depending upon the nature of the sealing application.

Three spring members 12 of a shallow-V-shape have center portions 13 which are spot welded to the inner surface of split ring 11. The center portions of the spring members are annealed or softened by the spot welding process, and the material is left in this condition rather than being restored to the temper which characterizes the other portions of the spring member.

Each spring member 12 includes a pair of leaf springs 15 extending from opposite ends of center portion 13 circumferentially along the inner periphery of the split ring. The unstressed leaf springs (as shown in FIG. 1) do not conform to the curvature of the inner surface of the split ring, and a clearance space 16 exists between the central part of each leaf spring and the inner surface of the split ring.

The leaf springs are shown with a slightly inwardly concave curvature, but they may also be shaped as straight chordal segments, or may even have an inwardly convex curvature, depending on the magnitude of loading force which is desired in the installed seal.

A typical application of the seal ring is shown in FIGS. 3 and 4, where an inner duct member 18 having a flanged end 19 with a ring groove 20 is telescoped within an outer duct member 21. These ducts illustrate in schematic form the type of sealing problem presented by a bleed-air duct in a fan-jet engine as discussed above. The duct parts are made with loose dimensional tolerances, and intentionally have some relative radial freedom to accommodate temperature variations.

It is essential that some longitudinal or axial freedom be provided between inner and outer duct members 18 and 21 to compensate for expansion and contraction of the engine portions to which the two duct members are secured. Both duct members are also subjected to considerable vibration during engine operation, and it is desirable to provide some radial damping between the components to avoid rattling and constant impaction of the parts which leads to rapid seal wear and the need for frequent seal and duct replacement.

Seal ring assembly 10 is fitted into ring groove 20 and split ring 11 is compressed until the inner duct member and seal ring assembly can be fitted within outer duct member 21. When the seal is thus installed, the ends of each leaf spring 15 bear on the inner surface of split ring 11, and the center portion of each leaf bears on the base of the ring groove as shown in FIG. 4. The individual leaf springs thus behave as simple beams which are substantially freely supported at their ends (see arrows 23 in FIG. 4) and are loaded between their ends (see arrows 24 in FIG. 4). The performance characteristics of this type of spring are predictable from standard strength-of-materials of stress-analysis texts which discuss the behavior of simple beams.

The two leaf springs that comprise integral spring member 12 act substantially independently of each other because of the isolation provided by annealed or softened center portion 13. If annealing of center portion 13 is not practical, the desired isolation of adjacent springs can be achieved by reducing the cross-section of portion 13 to make this portion flexible and hinge-like in action. No bending moments are introduced at the ends of the individual leaf springs, and each leaf spring functions as if it was terminated at the annealed center portion. The result is a series of effectively isolated leaf springs which have a relatively low spring rate and are capable of relatively large displacement.

The springs are thus effective in maintaining a desired loading on the split ring even though considerable wear occurs on the outer face of the split ring. That is, a considerable radial expansion of the ring due to surface wear can be tolerated without loss of the desired loading force from the leaf springs. The springs also damp radial motion and rattling of the fitted parts which would otherwise arise from the loose radial fit intentionally provided to accommodate thermal expansion.

The simple-beam behavior of the individual leaf springs is in sharp contrast to the characteristics of other styles of split-ring loading springs such as continuous wave springs. A wave spring lacks isolation between the individual chordal segments which extend between points of contact on the inner surface of the split ring. Bending moments are thus introduced at the ends of the segments, and the result is a high-rate spring which is capable of only limited displacement before the yield limit of the spring material is reached.

The spring rate of a wave spring is about fourteen times that of the isolated leaf springs of the invention, and loading force accordingly drops off rapidly as wear occurs on the split ring. The inventive seal springs work at lower stress levels than a corresponding wave spring, resulting in a longer service life before fatigue.

Leaf springs 15 are in effect hinged to center portion 13, and the introduction of bending moments at the spring ends is thus avoided. The resulting low spring rate means that little change in seal loading will occur as the springs gradually expand during sacrificial wear of the split-ring surfaces which bear on the outer duct member. Substantial increases in both seal life and seal effectiveness are thereby achieved, and useful life of the sealed duct parts is also improved.

Leaf springs 15 have a self-centering action which centers split ring 11 around the inner duct member. The loading force of the spring is low enough to permit longitudinal sliding between the inner and outer duct members, but the force is also sufficient to damp vibratory lateral motion which would otherwise cause fretting wear and short seal life.

The spring members and split ring can be made of a variety of materials, depending on the desired loading and wear characteristics of the assembly. A typical assembly is made from weld-compatible corrosion-resistant steels.

Another embodiment of the seal ring assembly is shown in FIG. 5. In this embodiment, a jacket or cap 25 of bronze-filled polytetrafluoroethylene plastic (sold under the trademark Teflon) is cemented or otherwise secured to split ring 11 for installation convenience. Alternatively, the cap may be fitted over but not secured to the ring. The cap has a C-shaped cross-section to cover the outer periphery of the split ring as well as the sides of the ring.

The purpose of cap 25 is to provide a replaceable sacrificial wearing surface which is an effective seal, and which does not scuff or fret the duct members during relative motion of the members. Extension of the cap along the sides of split ring reduces wear on the sides of the ring groove. Other materials may be used for the cap, depending upon the temperature and mechanical loading requirements on the seal. Plasma-coated materials such as a ceramic-molybdenum coating may also be used to eliminate galling and to provide lubrication for relative axial movement of the duct members.

Another embodiment of the invention is shown in FIG. 6 where split ring 11 is combined with an unattached spring member 30. The spring member is a split ring which corresponds roughly to the inside circumference of split ring 11, but is divided into chordal segments forming individual leaf springs 31. These leaf springs are connected by junctions 32 which are softened or annealed (or alternatively reduced in cross-section) to provide the hinging action described above in reference to spring member 12. Spring member 30 is thus generally similar in shape to a conventional wave spring, but entirely different in function and reaction force due to the presence of softened (or narrowed) junctions 32 which permit the individual leaf springs to deflect and react substantially independently of each other.

The assembly illustrated in FIG. 6 is particularly useful in small-diameter seals where it may be difficult to expand an attached-spring assembly sufficiently to slide over a duct member before fitting into a ring groove. Spring member 30 can be installed separately, and the installation problem is therefore avoided. The ring groove should be dimensioned to ensure that the spring member is retained captive by the outer split ring after assembly.

A mechanical hinge or pivot connection can also be provided between the individual leaf springs, but the annealed construction is preferred as it is simple and inexpensive. In the version of the seal ring assembly shown in FIGS. 1 and 2, the annealing occurs automatically when the spring members are spot-welded to the split ring. Localized cross-section reduction is also an effective way to provide the desired hinging action, and is particularly appropriate where the spring members are made of plastic materials or of metals which cannot be satisfactorily annealed.

Although the invention has been described in terms of a seal ring fitted in a groove on the inner member of two telescoped members, the invention is equally useful on a ring fitted in a groove defined by the outer member. In the latter case, the leaf springs are secured to the outer peripheral surface of the ring rather than the inner peripheral surface as shown in the drawings.

There has been described a simple and economically produced seal ring assembly which provides a relatively constant sealing force in spite of gradual expansion of the outer seal ring due to wear. The desired longitudinal freedom of the several sealed parts is achieved, while maintaining a centering action and damping force which prevents radial rattling and impacting of the loosely fitted loose-tolerance parts. The assembly is useful in many applications, but finds primary utility in high-temperature joints which are subjected to vibration.

What is claimed is:

1. A seal ring assembly for installation in a ring groove of a tubular member making a relatively loose telescoping fit with a second tubular member, the members being subject to temperature variations and vibration therebetween, comprising:

a split ring of uniform cross-sectional configuration and area at all locations circumferentially thereof except at a single gap radially through the ring; and a plurality of separate multiple-spring metal members having a shallow-V-shape and being of substantially uniform cross-section symmetrically arranged around the ring and each welded at a generally central portion to a peripheral surface of the ring, the central portion being annealed to divide each multiple-spring member into a pair of leaf springs which act substantially independently of each other when deflected, each leaf spring being substantially freely supported at its ends by the adjacent peripheral surface of the split ring so the springs deflect and react under loading substantially as simple beams; the metal members being sufficient in number and length that the several leaf springs cumulatively subtend a substantially major part of the arc of the ring; the leaf springs being operative to urge the ring radially away from the grooved member substantially uniformly along the extent of the ring when the ring is fitted into the ring groove to effect a seal between the tubular members, the leaf springs maintaining effective seal loading due to decoupling of the leaf springs in each member by the annealed central portion and resulting low-rate, large-displacement action of the leaf springs.

2. The assembly defined in claim 1 and further comprising a fluorocarbon-plastic annular cap having a generally C-shaped cross-section and fitted over the split ring to extend along opposite side surfaces of the ring, and to cover a ring peripheral surface opposite the peripheral surface to which the spring members are secured.

* * * * *